March 24, 1953 A. E. SEDELL 2,632,581
HOLDER FOR SECURING CAPS TO UTENSIL COVERS
Filed Jan. 26, 1951
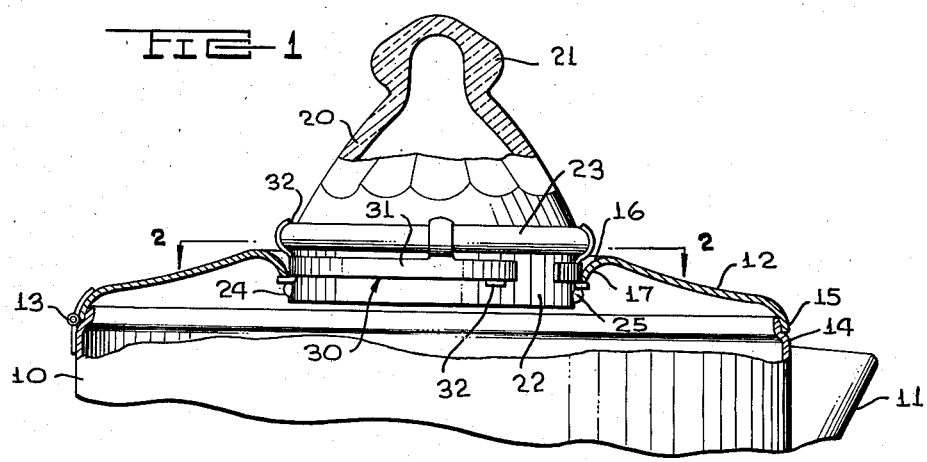
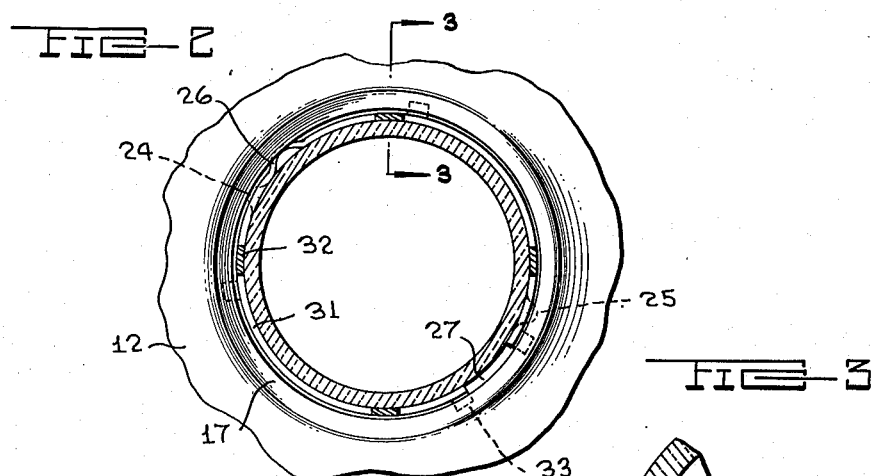
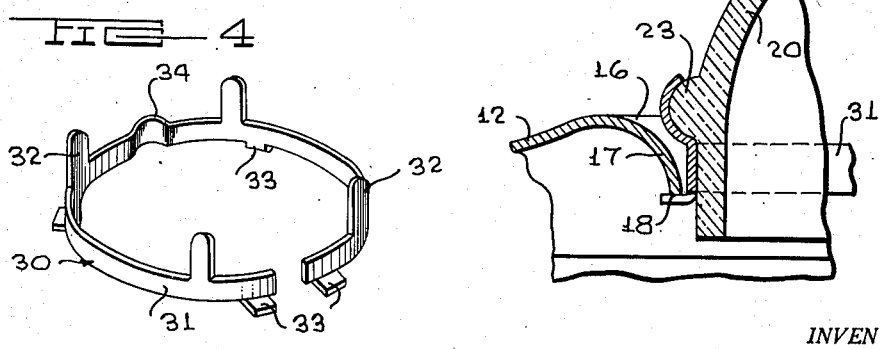
INVENTOR.
ALBERT E. SEDELL
BY
McMorrow, Berman & Davidson
ATTORNEYS Patented Mar. 24, 1953

2,632,581

UNITED STATES PATENT OFFICE 2,632,581

HOLDER FOR SECURING CAPS TO UTENSIL COVERS

Albert E. Sedell, Cook, Minn.

Application January 26, 1951, Serial No. 207,940

4 Claims. (Cl. 220—82.5)

This invention relates to utensil cap holders, and more particularly to a holder or retainer for securing a cap, such as the glass cap of a coffee-percolating utensil, in the opening provided for the cap in the utensil cover.

It is among the objects of the invention to provide an improved holder or retainer which can be easily mounted on a percolator cap and disposed in the cap-receiving opening in a percolator cover and engaged with the cover to secure the cap to the cover against accidental displacement; which can be easily applied to the cap and cover without the use of tools and without any modification of the cap or cover construction; and which is simple and durable in construction, economical to manufacture, effective in operation, and neat and attractive in appearance.

Other objects and advantages will become apparent from a consideration of the following description and appended claims in conjunction with the accompanying drawings, wherein:

Figure 1 is a side elevational view of the fragmentary upper portion of a coffee-percolating utensil, with parts of the utensil broken away and shown in cross-section to illustrate the application thereto of a cap holder illustrative of the invention;

Figure 2 is a transverse, cross-sectional view on the line 2—2 of Figure 1;

Figure 3 is a fragmentary, cross-sectional view on an enlarged scale on the line 3—3 of Figure 2; and Figure 4 is a perspective view of the cap holder.

With continued reference to the drawing, the coffee percolator illustrated comprises a receptacle 10 which may be of generally cylindrical shape and has a pouring spout 11 at one side and near the upper end thereof. A cover 12 closes the open upper end of the receptacle 10 and is hinged at its edge to the receptacle at the upper edge of the latter by a suitable hinge 13.

In the arrangement illustrated, the receptacle 10 is annularly inset at its upper end, as indicated at 14, to provide an annular recess extending around the upper open end of the receptacle and the cover 12 is provided with a marginal flange 15 which is received in the recess in the upper end of the receptacle to provide a substantially fluid-tight seal between the cover and the receptacle.

The cover is provided with a centrally located cap-receiving opening 16 surrounded by a downwardly and inwardly curved flange 17 extending annularly around the opening and terminating in a downwardly facing edge 18.

The percolator further comprises a cap 20, preferably formed of glass and of hollow, generally conical construction, having a closed upper end and provided with a knob formation 21 and having an open end received in the opening 16 of the cover and surrounded by a cylindrical portion 22 which fits closely in the cover opening. At a location spaced from the open end the cap is provided with an annular external ridge or bead 23 extending entirely around the cap at the inner end of the cylindrical portion 20 and having a substantially semicircular cross-sectional shape. The opening 16, while receiving the cylindrical portion 22 of the cap, is of insufficient size to permit the annular ridge 23 to pass therethrough.

The bead 23 may be of various cross-sectional shapes and may constitute a flange or ledge formation without in any way exceeding the scope of the invention.

The cylindrical portion 22 is provided near the open end of the cap with diametrically opposed detents 24 and 25, and the flange 16 is provided with diametrically opposed recesses 26 and 27, as particularly illustrated in Figure 2, through which the detents 24 and 25 may be passed to assemble the cap with the cover. After the detents are passed through the recesses 26 and 27, the cap is rotated relative to the cover to bring the detents out of registry with the recesses, and, if desired, the edge of the flange 16 may be inclined or cam shaped so that the cap will be tightened in the cover by rotation of the cap relative to the cover.

This arrangement provides a reasonably tight connection between the cap and the cover of a new percolator, but, after the percolator has been in use for only a short period of time, the flange 16 becomes deformed and enlarged, so that the above-described means can no longer be relied upon to retain the cap in the cover against accidental displacement. If the cap is loose in the cover, it will usually fall out, while the coffee is being poured from the percolator into a cup, the cap dropping into the partly filled cup and breaking the cup or spilling the hot coffee therefrom, with usually unpleasant results.

The holder or retainer for securing the cap 20 to the cover 12 against accidental displacement of the cap is generally indicated at 30 and comprises a split ring 31 of thin, malleable sheet metal, such as aluminum, aluminum alloy, copper or of any one of various alloys including copper, iron, lead, tin or zinc, and has a length somewhat less than the circumference of the cylindrical portion 22 of the cap and a width materially less than the width of this cylindrical portion.

Integral tongues 32 project perpendicularly from one longitudinal edge of the ring 31 at substantially equally spaced locations along the ring and integral ears 33 extend at right angles from the other longitudinal edge of the ring at substantially uniformly spaced-apart locations along the strap. The tongues 32 are longer than the ears 33 and the ring is so disposed on the cap that the edge of the ring from which the tongues 32 extend is nearest the annular bead 23. The tongues 32 extend from the ring 31 over the bead 23 and are bent closely around this bead, so that, together with the constriction of the ring around the cylindrical portion 22 of the cap, they firmly secure the holder 30 on the cap of the percolator.

The ears 33 extending from the other edge of the ring 31 are bent outwardly under the edge 18 of the cover flange 17, which surround the cap-receiving opening 16, and firmly secure the holder or retainer and the cap to the cover so that the cap cannot be accidentally displaced from the cover.

As the holder or retainer is made of easily bendable and non-resilient material, the ring portion 31 can be easily bent around the cylindrical portion of the cap, the tongues 32 can be easily bent around the external annular bead 23, and the ears 33 can be easily bent outwardly under the edge of the cover flange without the use of tools and without any modification of the cap or cover construction.

As is particularly illustrated in Figure 4, the ring portion 31 of the holder 30 is provided, substantially at its mid-length location, with an outset portion 34 through which one of the detents on the cap may pass as the holder is being mounted on the cap, the other detent passing through the space between the ends of the ring portion 31 when the latter is bent to circular shape.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination, a cap having an open end and a closed end and an annular external bead surrounding the cap and spaced from the open end of the cap, a cover formed with a cap receiving opening of a size smaller than said bead, a portion of the cap between said bead and the open end of the cap being removably positioned in said opening with the bead engaged with one side of the cover around said opening, a cap retainer comprising a ring surrounding and constricted upon said portion of the cap, said ring having circumferentially spaced tongues projecting therefrom through said opening and bent around said bead, and ears on and projecting from said ring and engaging the side of the cover remote from said bead.

2. In combination, a cap having an open end and a closed end and an annular external bead surrounding the cap and spaced from the open end of the cap, a cover formed with a cap receiving opening of a size smaller than said bead, a portion of the cap between said bead and the open end of the cap being removably positioned in said opening with the bead engaged with one side of the cover around said opening, a cap retainer comprising a ring surrounding and constricted upon said portion of the cap, said ring having circumferentially spaced tongues projecting therefrom through said opening and bent around said bead, and ears on and projecting from said ring and engaging the side of the cover remote from said bead, said ring being split to enable accommodation thereof to caps of different diameters.

3. In combination, a cap having an open end and a closed end and an annular external bead surrounding the cap and spaced from the open end of the cap, a cover formed with a cap receiving opening of a size smaller than said bead, a portion of the cap between said bead and the open end of the cap being removably positioned in said opening with the bead engaged with one side of the cover around said opening, a cap retainer comprising a ring surrounding and constricted upon said portion of the cap, said ring having circumferentially spaced tongues projecting therefrom through said opening and bent around said bead, and ears on and projecting from said ring and engaging the side of the cover remote from said bead, said tongues and ears extending from opposite edges of said ring.

4. A retainer consisting of a split ring, circumferentially spaced tongues and ears projecting from opposite edges of the ring, the tongues having portions directed radially inwardly with respect to the center of the ring and the ears having portions directed radially outwardly with respect to the center of the ring.

ALBERT E. SEDELL.

REFERENCES CITED

The following references are of record in the file of this patent:

UNITED STATES PATENTS

| Number | Name | Date |
|---|---|---|
| 2,523,526 | Sciurba | Sept. 26, 1950 |